United States Patent [19]

Reinecke et al.

[11] Patent Number: 4,558,092
[45] Date of Patent: Dec. 10, 1985

[54] AQUEOUS DISPERSION OF SULFO-CONTAINING POLYMERS FOR CEMENT ADDITIVE APPLICATIONS

[75] Inventors: Rolf Reinecke, Wiesbaden; Helmut Rinno, Hofheim am Taunus; Gerhart Schultz, Darmstadt, all of Fed. Rep. of Germany

[73] Assignee: Hoechst Aktiengesellschaft, Fed. Rep. of Germany

[21] Appl. No.: 498,942

[22] Filed: May 27, 1983

[30] Foreign Application Priority Data

May 29, 1982 [DE] Fed. Rep. of Germany ....... 3220384

[51] Int. Cl.$^4$ .............................................. C08L 41/00
[52] U.S. Cl. .................................... 524/817; 524/547; 524/813; 526/287
[58] Field of Search ....................... 524/547, 813, 817; 526/287

[56] References Cited

U.S. PATENT DOCUMENTS 3,255,138  6/1966  Kruckenberg et al. ............. 524/547
3,689,448  9/1972  Berger et al. ........................ 524/813
4,242,242  12/1980  Allen ................................... 524/547
4,373,056  2/1983  Besecke et al. ...................... 524/547

FOREIGN PATENT DOCUMENTS 0048320   3/1982  European Pat. Off. ............ 524/817
2082600A  3/1982  United Kingdom ................ 526/287

*Primary Examiner*—Paul R. Michl
*Assistant Examiner*—Alex H. Walker
*Attorney, Agent, or Firm*—Berman Aisenberg & Platt

[57] ABSTRACT

An aqueous plastics dispersion is manufactured by co-polymerization of several olefinically unsaturated monomers, one of them at least being free from amide and sulfo groups, one of them at least having an amide group and one of them at least having a sulfo group. Copolymerization is carried out in an aqueous medium under usual conditions. The resulting copolymer has a second order transition temperature of 20° C. at most. The plastics dispersion is compatible with cement and serves as additive in cement-containing building materials.

17 Claims, No Drawings

AQUEOUS DISPERSION OF SULFO-CONTAINING POLYMERS FOR CEMENT ADDITIVE APPLICATIONS

The invention provides an aqueous plastic dispersion on the basis of a copolymer of olefinically unsaturated compounds, a process for the manufacture of this plastic dispersion, and use thereof as a cement additive.

It is known that soft polymers of ethylenically unsaturated compounds in admixture with usual inorganic fillers form the basis of cement and sealing compositions (see German Offenlegungsschrift No. 1,569,910=U.S. Pat. No. 3,551,374). These polymers are a mixture of (A) emulsion polymers of esters from ethylenically unsaturated carboxylic acids having 3 to 5 carbon atoms and alkanols having 1 to 12 carbon atoms, and (B) polymers of esters from (meth)acrylic acid and alkanols having 2 to 8 carbon atoms and/or of vinylalkyl ethers having 1 to 4 carbon atoms in the alkyl radical, and/or butadiene and/or polymers of isobutylene and/or isoprene. The above emulsion polymers are used in the form of at least 50% aqueous dispersions; they should have a second order transition temperature of below $-5°$ C.

An aqueous dispersion of a pressure sensitive copolymer which is composed of 0.1 to 1.5 weight % of 2-acrylamido-2-methylpropanesulfonic acid, at least one ester of acrylic acid and/or methacrylic acid having 6 to 20 carbon atoms and a monomer selected from the group of α-olefins having 2 to 10 carbon atoms, vinyl esters of alkanoic acids having from 2 to 10 carbon atoms, ethyl and methyl esters of acrylic and methacrylic acid, acrylonitrile, methacrylonitrile, styrene, vinyltoluene and/or vinyl chloride (see German Offenlegungsschrift No. 2,524,064=U.S. Pat. Nos. 2,931,087 and 4,012,560) has also been described. The copolymer has a glass transition temperature in the range of from $-15°$ to $-75°$ C. The emulsion is used as adhesive in adhesive tapes, sheets and foams sensitive to pressure, it adheres well to resin surfaces, paper, metal, and painted surfaces.

These known dispersions are unfit for combination with the mineral binder cement (see Comparative examples).

It is the object of the invention to provide an aqueous plastic dispersion (based highly elastic copolymers having a low second order transition temperature), which is compatible with cement.

The invention thus provides an aqueous plastic dispersion based on a copolymer of olefinically unsaturated compounds, wherein the copolymer is composed substantially of (a) from 90 to 97.7 weight % of moieties of at least one olefinically unsaturated monomer which is free from amide and sulfo groups, (b) from 0.5 to 5 weight % of moieties of at least one olefinically unsaturated monomer having one amide group, and (c) from 1.8 to 5 weight % of moieties of at least one olefinically unsaturated monomer of the formula

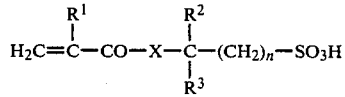

in which $R^1$, $R^2$ and $R^3$ are identical or different and represent each a hydrogen atom or a methyl radical, X is an oxygen atom or an imino group, and n is zero or an integer of from 1 to 10, and has a second order transition temperature not exceeding 20° C.

Preferably, the second order transition temperature of the copolymer does not exceed $-20°$ C.

The invention further provides a process for the manufacture of an aqueous plastic dispersion by polymerization of olefinically unsaturated compounds in an aqueous medium under usual conditions, which comprises using as olefinically unsaturated compounds (a) at least one olefinically unsaturated monomer which is free from amide and sulfo groups, (b) at least one olefinically unsaturated monomer having one amide group, and (c) at least one olefinically unsaturated monomer of the formula

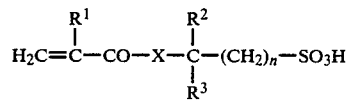

in which $R^1$, $R^2$ and $R^3$ are identical or different and represent each a hydrogen atom or a methyl radical, X is an oxygen atom or an imino group, and n is zero or an integer of from 1 to 10; the resulting copolymer having a second order transition temperature of up to 20° C. at most.

The invention relates furthermore to the use of the dispersion as a cement additive.

The olefinically unsaturated monomer free from amide and sulfo groups (group a) is used in an amount of from 90 to 97.7, preferably 92 to 97, weight %, the olefinically unsaturated monomer having one amide group (group b) is used in an amount of from 0.5 to 5, preferably 1 to 4, weight %, and the olefinically unsaturated monomer having one sulfo group (group c) is used in an amount of from 1.8 to 5, preferably 2 to 4, weight % (each relative to the total monomer amount).

In order to adjust the intended second order transition temperature in the copolymer contained in the plastic dispersion of the invention, monomers of group (a) forming homopolymers having a relatively low second order transition temperature (below 0° C.) are combined with other monomers of group (a) forming homopolymers having a relatively high second order transition temperature (above 20° C.). According to the invention, the second order transition temperature is determined by differential thermoanalysis. In simple cases, the composition of a copolymer having an intended second order transition temperature $T_g$ (Kelvin) may be calculated alternatively according to the following equation:

$$\frac{1}{T_g} = \sum_1^i \frac{W_i}{T_{gi}}$$

in which $T_{gi}$ is the second order transition temperature of the homopolymer i in Kelvin, and $W_i$ is the weight proportion of the homopolymer i in the copolymer. Further indications on second order transition temperatures of various homopolymers can be taken from Polymer Handbook by Brandrup/Immergut, ed. 1975, pages III/139 to 192.

Monomers forming homopolymers having a low second order transition temperature are above all alkyl esters of olefinically unsaturated monocarboxylic acids having 3, 4 or 5 carbon atoms, or of dicarboxylic acids having 4 or 5 carbon atoms which contain each from 4 to 18, preferably 4 to 12, non-tertiary carbon atoms in the alkyl radical, and ethylene. Such alkyl esters are above all esters of acrylic, crotonic, fumaric, maleic or itaconic acid, such as n-butylacrylate, n-hexylacrylate, 2-ethylhexylacrylate, n-octylacrylate, laurylacrylate, tridecylacrylate, n-butylmethacrylate, n-octylmethacrylate, 2-ethylhexylmethacrylate, laurylmethacrylate, n-butylcrotonate, n-octylcrotonate, dibutylfumarate, dioctylfumarate, dibutylmaleate, dioctylmaleate, dibutylitaconate and dioctylitaconate.

Monomers forming homopolymers having a high second order transition temperature are above all lower alkyl esters of methacrylic acid having from 1 to 3 carbon atoms in the alkyl radical, furthermore vinyl esters of lower carboxylic acids having preferably from 2 to 4 carbon atoms, and styrene, acrylonitrile and vinyl chloride. Suitable methacrylic acid esters are especially methylmethacrylate and ethylmethacrylate, and suitable vinyl esters are vinyl acetate, vinyl propionate and vinyl butyrate.

Advantageous is the use of a monomer within group (a) which improves the stability of the dispersion. Especially suitable are olefinically unsaturated monocarboxylic acids having 3, 4 or 5 carbon atoms or dicarboxylic acids having 4 or 5 carbon atoms, for example acrylic, methacrylic, crotonic, fumaric, maleic or itaconic acid. The carboxylic acid is used in an amount of from zero to 5, preferably 1 to 3, weight % (relative to the total monomer amount).

Optionally, a multifunctional monomer serving for the preparation of cross-linked copolymers is used in addition. Suitable are above all polyene compounds or hydroxy-group-containing olefinically unsaturated compounds which may be etherified with a lower alkanol. Polyene compounds are especially polyacrylates, polymethacrylates, polyvinyl compounds and polyallyl compounds, for example ethyleneglycoldiacrylate, butanediol-(1,4)-dimethylacrylate, divinylbenzene, tetraallyloxethane and pentaerythritol-triacrylate. Suitable hydroxy compounds are, for example, 2-hydroxyethylacrylate, 2-hydroxyethylmethacrylate or N-methylolacrylamide. The multifunctional monomer is used in an amount of from zero to 10, preferably zero to 5, weight % (relative to the total monomer amount), while the amount of monomers of group a) is correspondingly reduced.

As olefinically unsaturated monomer having an amide group (group b), an amide of an olefinically unsaturated monocarboxylic acid having 3, 4 or 5 carbon atoms is used, that is, acrylamide, methacrylamide or crotonic acid amide.

An essential characteristic of the invention is the use of a monomer of group (b) in combination with an olefinically unsaturated monomer (group c) of the formula

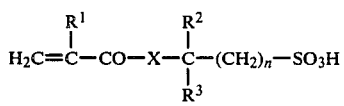

in which $R^1$, $R^2$ and $R^3$ are identical or different and represent each a hydrogen atom or a methyl radical, X is an oxygen atom or an imino group, and n is zero or an integer of from 1 to 10, preferably 1 to 3.

Especially suitable sulfonic acids of group (c) are ω-acrylamido-ω,ω-dimethyl-alkanesulfonic acids having 1, 2 or 3 carbon atoms in the alkane group, that is, compounds of the formula

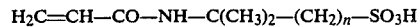

in which n is 1, 2 or 2.

These sulfonic acids are linked to acrylic or methacrylic acid via an ester group or an amide group. Examples are 3-sulfopropylacrylate, 3-sulfopropylmethacrylate, 2-sulfoethylacrylate and 2-sulfoethylmethacrylate, furthermore 2-methacrylamino-2,2-dimethylethanesulfonic acid, 2-acrylamido-ethanesulfonic acid, 2-methacrylamido-ethanesulfonic acid, 2-acrylamido-n-butanesulfonic acid, 2-methacrylamido-n-butanesulfonic acid, 2-methacrylamido-isobutanesulfonic acid and especially 2-acrylamido-2,2-dimethylethanesulfonic acid.

The dispersion of the invention is manufactured by polymerization of the corresponding monomers in an aqueous medium under the usual conditions of emulsion polymerization, that is, in the presence of a free radical-forming initiator and an emulsifier, and optionally in the presence of a protective colloid and a regulator. The polymerization temperature is normally from zero to 100° C., preferably 20° to 90° C. Polymerization is carried out in the form of a batch process or a dosage process; the latter being a process of either monomer addition or, preferably, emulsion addition.

In the emulsion addition process, a mixture of water and optionally up to 30 weight % of an aqueous monomer emulsion is first introduced into a reaction vessel. The monomer emulsion consists of water, the monomers and the emulsifier, and optionally a regulator and a protective colloid. This mixture is then heated to polymerization temperature, and after the reaction has started, the remainder of the monomer emulsion is added in doses while maintaining the reaction temperature and constantly agitating the reaction mixture, preferably by stirring. Preferably, the monomers of groups (b) and (c) are fed in doses parallelly to the monomer(s) of group (a). Simultaneously with the monomer emulsion the initiator is fed in. The feeding being complete, the dispersion obtained is heated further for a certain time. After cooling to room temperature, the dispersion is adjusted to a pH of 3 to 12, preferably 7 to 10, by addition of a water-soluble base, preferably an alkali metal hydroxide or ammonia.

For the manufacture of the dispersion, all emulsifiers normally used for an emulsion polymerization are suitable, that is, ionic and/or nonionic emulsifiers. As ionic emulsifers, preferably anionic ones are used, especially alkali metal or ammonium salts of sulfuric or phosphoric acid partial esters of aliphatic alcohols or alkylphenols which optionally are reacted with up to 50 mols of ethylene oxide per hydroxy group. Furthermore suitable are alkyl- or arylsulfonates or mono- or diesters of sulfosuccinic acid. Examples are the sodium salt or ammonium salt of sulfuric acid semiester of tri-tert.-butylphenol reacted with 7 or 8 mols of ethylene oxide, sodium laurylsulfate, the sodium salt of a lauryl alcohol ether sulfate containing 2 to 3 mols of ethylene oxide, sodium dodecylbenzenesulfonate, sodium tetrapropylbenzenesulfonate, or the sodium salt of sulfosuccinic acid dihexyl ester. Suitable nonionic emulsifiers are especially polyglycol ethers of long-chain alkanols having preferably 10 to 20 carbon atoms, or of alkylphenols having preferably 6 to 12 carbon atoms in the alkyl radical; the number of ethylene oxide units being in the range of from 4 to 100. Addition products of ethylene oxide onto polypropyleneglycol are also suitable. Examples of nonionic emulsifiers are reaction products of ethylene oxide with lauryl alcohol, stearyl alcohol, oleyl alcohol, octylphenol, nonylphenol, diisopropylphenol, tri-isopropylphenol, di-t-butylphenol and tri-t-butylphenol. The total amount of emulsifiers is preferably 0.1 to 5 weight % (relative to the total monomer amount).

Emulsion polymerization is optionally carried out in the presence of a protective colloid the amount of which is up to 2 weight % (relative to the total monomer amount). Suitable protective colloids are, for example, polyvinyl alcohol, poly-N-vinylpyrrolidone, hydroxyethylcellulose, carboxymethylcellulose or copolymers of maleic acid with vinyl compounds such as vinylalkyl ethers, styrene, ethylene or propylene.

Polymerization is carried out in the presence of a free radical-forming initiator which is used in an amount of 0.1 to 1 weight % (relative to the total monomer amount). Especially suitable are water-soluble inorganic per compounds which, depending temperature, are used either alone or in combination with a reducing agent. The amount of reducing agent is likewise 0.1 to 1 weight % (relative to the total monomer amount). Water-soluble per compounds are above all alkali metal or ammonium salts of peroxydisulfuric or peroxydiphosphoric acid, for example sodium peroxydisulfate, potassium peroxydisulfate, ammonium peroxydisulfate, sodium peroxydiphosphate or ammonium peroxydiphosphate. In combination with reducing agents, organic per compounds, especially diacylperoxides, such as dibenzoylperoxide, diacetylperoxide or dilaurylperoxide, or alkyl esters of percarboxylic acids having from 4 to 12 carbon atoms and in which the alkyl radical is branched and contains 3 to 6 carbon atoms, for example isopropylperisooctoate, t-butylperisooctoate, isopropylperisopivalate, t-butylperisopivalate, isopropylperisobutyrate and t-butylperisobutyrate, may also be employed.

Suitable reducing agents are especially alkali metal or ammonium salts of sulfur-containing acids having a reducing action, for example sulfites, bisulfites, pyrosulfites, dithionites, thiosulfates, formaldehyde-sulfoxylates and formamidine-sulfinates, furthermore ascorbic acid, hydroxylamine or hydrazine. The reducing agent is employed optionally in combination with a catalytically active amount of a heavy metal salt, especially an iron, cobalt, cerium or vanadyl salt, serving as accelerator.

The process of the invention is optionally carried out in the presence of 2 weight % at most (relative to the total monomer amount) of a regulator. Suitable regulators are mercaptans, especially alkyl mercaptans having from 4 to 16 carbon atoms, for example n-butylmercaptan, t-butylmercaptan, and preferably n-dodecylmercaptan, furthermore thioglycol, thioglycerol and thioglycolic acid. The regulator is added parallelly to or before or after the monomers.

The plastic dispersion of the invention has a solids content of from 40 to 70, preferably 50 to 65, weight %. It is absolutely compatible with cement and can therefore be applied as cement additive, for example in joint sealer compositions, road pavement compositions, repair compositions, coating compositions, intermediate and levelling courses. The dispersion is furthermore used in cement-containing, elastic building adhesives; these latter ones are thus distinguished by an increased water resistance. When applying in accordance with the invention the plastic dispersion as additive in cement-containing building materials, a composition is obtained which after hardening is elastic or highly elastic (depending on the amount of additive) and may form a flexible film. The dispersion-containing building material does not solidify faster than a comparable mortar free from the dispersion, and it forms a homogeneous texture after hardening. Neither the processing properties nor the strength of the mortar are adversely affected by addition of the plastic dispersion of the invention.

This property of the building material was not to be expected, because normally a building material on the basis of cement is merely modified by the addition of a usual plastic dispersion, and the properties of the mineral binder, that is, cement, predominate.

The plastic dispersion is tested as follows with respect to cement compatibility:

In a laboratory mortar mixer provided with planetary agitator, 500 g of Portland cement PZ 35 T, 500 g of standard sand I, 1,000 g of standard sand II and 100 g of the plastic dispersion to be teted are mixed for 3 minutes with such an amount of water that the total water amount including the water content of the plastic dispersion is 250 g. Thus, the water/cement factor is 0.5. The mass obtained is subjectd to a consistency test by determining the slump value (1) immediately after the manufacture, and (2) after 15 minutes. The corresponding apparatus is a shaker table according to German Industrial Standard DIN 1060 which substantially consists of a circular steel plate covered with a corresponding glass plate which is lifted by 10 mm and dropped again by every revolution of a rotating hoist shaft. For determining the slump value, the mortar mass is introduced in 2 layers into a slump cone placed in the center of the glass plate. Each layer is compacted by 10 impacts of a standard wooden tamper having a weight of 250 g; the slump cone being pressed hard against the glass plate. After compaction of the layers and addition of a further amount of mass, the protruding material is struck off with a rule. After 10 to 15 seconds the slump cone is lifted slowly in vertical direction. The remaining mortar cone is then shaken for about 15 seconds by 15 strokes of the shaker table and thus spread on the table in the form of a cake. The diameter of this cake is measured in two directions each forming a right angle with the other (slump value). The plastic dispersion to be tested is considered as being incompatible with cement when the mortar mass becomes friable within 15 minutes or becomes very rigid, which manifests itself by a considerably decrease of the slump value.

The plastic dispersion of the invention is especially suitable as additive for cement-containing building materials which are applied as hydraulically hardening thin-bed mortars and excel by an increased shear bond strength. This latter strength is tested as follows (see German Industrial Standard DIN 18156, Part 2):

In a laboratory mortar mixer provided with planetary agitator, there are mixed 390 g of Portland cement PZ 35 F, 600 g of quartz sand F 35, 5 g of a commercial cellulose ether the 2 weight % solution of which has a viscosity of 6,000 mPa.s at 20° C., 150 g of water and 100 g of the plastic dispersion to be tested which has been adjusted to a solids content of 50 weight %. The test mortar so obtained is applied to a concrete plate by means of a comb trowel, and within 5 minutes ceramic tiles (4 cm×4 cm) are placed onto the mortar layer and subjected each for 30 seconds to a load of 10 N. The test specimens so obtained are stored in horizontal position (a) for 28 days at standard climate 23/50 according to DIN 50014, (b) for 7 days at standard climate 23/50 according to DIN 50014 and then for 21 days in water at 20° C., and (c) for 21 days at standard climate 23/50 according to DIN 50014 and then 1 day in water at 20° C. For testing the shear bond strength, a commercial, calibrated apparatus is used the tension rods of which are bonded to the ceramic tiles by means of a two-component adhesive.

The following examples illustrate the invention; percentages are by weight in each case.

EXAMPLE 1

200 g of water were introduced into a three-necked flask having a capacity of 2 liters and provided with agitator and dropping funnel, and heated to 80° C. 10 g of a monomer emulsion having the following composition were added:
  233 g water
  54 g 50% aqueous solution of the sodium salt of a tri-t-butylphenol etherified with 8 mols of ethylene oxide and sulfated,
  27 g methacrylamide
  18 g 2-acrylamido-2,2-dimethylethanesulfonic acid
  900 g 2-ethylhexylacrylate
  18 g methacrylic acid
  9 g acrylic acid
  9 g 2-hydroxyethylmethacrylate
  1.4 g butanediol-(1,4)-dimethacrylate Subsequently, 8 ml of a solution of 1.9 g of ammonium peroxydisulfate in 50 ml of water and 11 ml of a solution of 5.7 g of sodium disulfite in 50 ml of water were added. Thereafter, the remainder of the monomer emulsion was metered in within 3 hours, and parallelly the remainder of the ammonium persulfate solution and of the sodium disulfite solution each was added within 5 hours. After a further reaction time of 2 hours at a temperature of 80° C., the reaction mixture was cooled to room temperature, and adjusted to pH 8 by adding 10% sodium hydroxide solution. The coagulate-free dispersion obtained had a solids content of 60.8%.

EXAMPLE 2

Example 1 was repeated, using the following monomers:
  18 g methacrylamide
  9 g acrylamide
  18 g 2-acrylamido-2,2-dimethylethane-sulfonic acid
  720 g 2-ethylhexylacrylate
  180 g methylmethacrylate
  27 g methacrylic acid
  9 g 2-hydroxyethylmethacrylate The coagulate-free dispersion obtained had a solids content of 60.2%.

EXAMPLE 3

Example 1 was repeated, using the following monomers:
  9 g methacrylamide
  36 g 2-acrylamido-2,2-dimethylethanesulfonic acid
  810 g 2-ethylhexylacrylate
  90 g acrylonitrile
  27 g acrylic acid
  9 g 2-hydroxyethylmethacrylate The coagulate-free dispersion obtained had a solids content of 58.1%.

EXAMPLE 4

Example 1 was repeated using the following monomers:
  27 g methacrylamide
  18 g 2-acrylamido-2-dimethylethanesulfonic acid
  900 g 2-ethylhexylacrylate
  18 g methacrylic acid
  9 g acrylic acid 603 g of water were furthermore used for the monomer emulsion. The coagulate-free dispersion obtained had a solids content of 49.7%.

EXAMPLE 5

194 g of water were introduced into a three-necked flask having a capacity of 2 liters and provided with agitator and dropping funnel, and heated to 80° C. 10 g of a monomer emulsion having the following composition were added:
  297 g water
  28.7 g nonylphenol reactd with 30 mols ethylene oxide
  2.6 g nonylphenol, reacted with 10 mols ethylene oxide
  17.2 g methacrylamide
  25.8 g 3-sulfopropylmethacrylate
  817 g 2-ethylhexylacrylate
  43 g methylmethacrylate
  25.8 g methacrylic acid Subsequently, 8 ml of a solution of 1.9 g of ammonium peroxydisulfate in 50 ml of water and 11 ml of a solution of 5.7 g of sodium disulfite in 50 ml of water were added. Thereafter, the remainder of the monomer emulsion was metered in within 3 hours, and parallelly the remainder of the ammonium persulfate solution and of the sodium disulfite solution each was added within 5 hours. After a further reaction time of 2 hours at a temperature of 80° C., the reaction mixture was coded to room temperature, and adjusted to pH 8 by adding 10% sodium hydroxide solution. The coagulate-free dispersion obtained had a solids content of 59.5%.

COMPARATIVE EXAMPLE 1

According to the indications of Example 1 of German Offenlegungsschrift No. 2,524,064, a mixture of 217.9 g of water, 1.3 g of sodium bicarbonate and 2.5 g of potassium peroxydisulfate was introduced into a reaction vessel. 7% of a monomer emulsion A and 5% of a monomer emulsion B were added. The monomer emulsions had the following composition:

A:
  35.7 g water
  11.0 g sulfate ester of a nonylphenol-ethylene oxide condensate with 30 ethylene oxide moieties per molecule
  0.54 g sodium hydroxide
  2.75 g 2-acrylamido-2,2-dimethylethanesulfonic acid B:
  169.0 g water
  2.3 g sodium dioctylsulfosuccinate
  358.0 g 2-ethylhexylacrylate 189.3 g vinylacetate After heating of the mixture, the remainder of each of the monomer emulsions was added at a constant rate within 3 hours, the reaction temperature being maintained at 78° to 82° C. The dispersion obtained had a soids content of 55.8%.

COMPARATIVE EXAMPLE 2

According to the indications of German Offenlegungsschrift No. 1,569,910 with respect to the composition of especially suitable polymers (see particularly page 4 at the foot and page 5 at the top), Example 1 was repeated using the following monomers:
783 g 2-ethylhexylacrylate
99 g acrylonitrile
18 g acrylic acid The dispersion obtained had a solids content of 59.6%.

APPLICATION EXAMPLES

Mortar masses containing the plastic dispersions obtained according to Examples 1 to 4 and Comparative Examples 1 and 2 were prepared, and the cement compatibility of these dispersions was tested as indicated in the specification. For a further comparison, a mortar mass was prepared correspondingly without addition of dispersion, and also tested. The results are listed in Table 1.

Building adhesives containing the plastic dispersions obtained according to Examples 1 to 4 were also prepared, and the shear bond strength thereof was tested as indicated in the specification. Another adhesive without dispersion was prepared correspondingly and also tested for comparison. The results can be taken from Table 2.

TABLE 1

| Dispersion of Example | Second order transition temperature of the copolymer (°C.) | Slump value (cm) imm. | after 15 min. |
|---|---|---|---|
| 1 | −66 | 15/15 | 12.5/13 |
| 2 | −33 | 15.5/15 | 12.5/13 |
| 3 | −57.5 | 15/16 | 13.5/14 |
| 4 | −62.5 | 15.5/15 | 13/13.5 |
| Comp. 1 | −31.5 | 13/13.5 | 10/10 |
| Comp. 2 | −30 | cannot be determined | |
| — | — | 15/15 | 12.5/13.5 |

TABLE 2

| Dispersion of Example | Shear bond strength (N/mm²) after storage | | |
|---|---|---|---|
| | (a) 28 d dry | (b) 7 d dry + 21 d wet | (c) 21 d dry + 1 d wet |
| 1 | 0.78 | 0.53 | 0.48 |
| 4 | 1.8 | 1.16 | 0.9 |
| — | 0.21 | 0.12 | 0.04 |

What is claimed is:

1. An aqueous dispersion of a copolymer of olefinically unsaturated compounds, wherein the copolymer is composed substantially of
   (a) from 90 to 97.7 weight % of moieties of at least one olefinically unsaturated monomer which is free from amide and sulfo groups,
   (b) from 0.5 to 5 weight % of moieties of at least one olefinically unsaturated monomer having one amide group, and
   (c) from 1.8 to 5 weight % of moieties of at least one olefinically unsaturated monomer of the formula

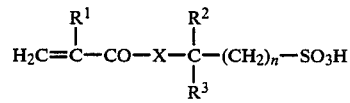

in which $R^1$, $R^2$ and $R^3$ are identical or different, each representing a hydrogen atom or a methyl radical, X is an oxygen atom or an imino group, and n is zero or an integer of from 1 to 10,
and has a second order transition temperature not exceeding 20° C.

2. A dispersion as claimed in claim 1, wherein the copolymer is an emulsion copolymerizate having a second order transition temperature not exceeding −20° C.

3. A dispersion useful as a cement additive as claimed in claim 1, wherein at least one monomer of component (a) is an ester of an olefinically unsaturated monocarboxylic acid having 3, 4 or 5 carbon atoms, or a dicarboxylic acid having 4 or 5 carbon atoms.

4. A dispersion useful as a cement additive as claimed in claim 1, wherein the monomer of component (b) is an amide of an olefinically unsaturated monocarboxylic acid having 3, 4 or 5 carbon atoms.

5. A dispersion useful as a cement additive as claimed in claim 1, wherein the monomer of component (c) is an ω-acrylamido-ω,ω-dimethyl-alkanesulfonic acid having 1, 2 or 3 carbon atoms in the alkane group.

6. A process for manufacturing an aqueous plastic dispersion by emulsion polymerization of olefinically unsaturated compounds in an aqueous medium, the olefinically unsaturated compounds comprising:
   (a) at least one olefinically unsaturated monomer which is free from amide and sulfo groups,
   (b) at least one olefinically unsaturated monomer having one amide group, and
   (c) at least one olefinically unsaturated monomer of the formula

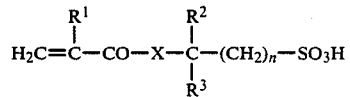

in which $R^1$, $R^2$ and $R^3$ are identical or different, and represent each a hydrogen atom or a methyl radical, X is an oxygen atom or an imino group, and n is zero or an integer of from 1 to 10; the resulting copolymer having a second order transition temperature of up to at most 20° C.

7. Use of a plastics dispersion as claimed in claim 1 as cement additive.

8. A dispersion according to claim 1 wherein X is an oxygen atom.

9. A dispersion according to claim 1 wherein X is an imino group.

10. A dispersion according to claim 1 comprising an ionic emulsifier.

11. A dispersion as claimed in claim 1 which is compatible with cement and wherein the copolymer comprises from 1 to 4 weight % of component (b).

12. A dispersion as claimed in claim 3 which is compatible with cement and wherein at least one monomer of component (a) is an ester of an olefinically unsaturated monocarboxylic acid having from 3 to 5 carbon atoms.

13. A dispersion as claimed in claim 3 which is compatible with cement and wherein at least one monomer of component (a) is an ester of an olefinically unsaturated dicarboxylic acid having 4 to 5 carbon atoms.

14. A dispersion as claimed in claim 5 which is compatible with cement and wherein the monomer of component (c) has 1 carbon atom in the alkane group.

15. A dispersion as claimed in claim 5 which is compatible with cement and wherein the monomer of component (c) has 2 carbon atoms in the alkane group.

16. A dispersion as claimed in claim 5 which is compatible with cement and wherein the monomer of component (c) has 3 carbon atoms in the alkane group.

17. An aqueous dispersion as claimed in claim 1 which is compatible with cement and wherein component (a) comprises from zero to 5 weight percent (relative to the total monomer amount) of olefinically unsaturated monocarboxylic acid having 3, 4 or 5 carbon atoms or olefinically unsaturated dicarboxylic acid having 4 or 5 carbon atoms.

* * * * *